(12) United States Patent
Waldock

(10) Patent No.: US 10,184,770 B2
(45) Date of Patent: Jan. 22, 2019

(54) MOBILE PLATFORM FOR THE DELIVERY OF BULK EXPLOSIVE

(71) Applicant: LDE Corporation, Joplin, MO (US)

(72) Inventor: Kevin H. Waldock, Singleton (AU)

(73) Assignee: LDE Corporation, Joplin, MO (US)

( * ) Notice: Subject to any disclaimer, the term of this patent is extended or adjusted under 35 U.S.C. 154(b) by 195 days.

(21) Appl. No.: 15/049,108

(22) Filed: Feb. 21, 2016

(65) Prior Publication Data
US 2016/0356590 A1   Dec. 8, 2016

Related U.S. Application Data

(63) Continuation of application No. 14/617,923, filed on Feb. 9, 2015, now Pat. No. 9,267,777, which is a (Continued)

(51) Int. Cl.
*F42D 1/22* (2006.01)
*F42D 1/10* (2006.01)
*B60P 3/22* (2006.01)

(52) U.S. Cl.
CPC ............... *F42D 1/22* (2013.01); *B60P 3/224* (2013.01); *B60P 3/2205* (2013.01); (Continued)

(58) Field of Classification Search
CPC ..... F42D 1/10; F42D 3/00; F42D 1/22; B60P 3/22; B60P 3/2205; B60P 3/2215; (Continued)

(56) References Cited

U.S. PATENT DOCUMENTS 2,272,572 A   2/1942  Merry
3,040,615 A   6/1962  Johansson et al.
(Continued)

FOREIGN PATENT DOCUMENTS

CN   86102842 A   10/1987
CN   2707757 Y   7/2005
GB   2338429 A   12/1999

OTHER PUBLICATIONS

Notification of Transmittal of International Search Report and the Written Opinion of the International Searching Authority, International Search Report, and Written Opinion of the International Searching Authority for PCT/US06/36481.

*Primary Examiner* — Benjamin P Lee
(74) *Attorney, Agent, or Firm* — Christopher J. Kulish

(57) ABSTRACT

The present invention is directed to a mobile platform for the delivery of bulk explosives to a blast hole. One embodiment of the platform provides the ability to obtain weight information relating to the contents of a tank that is associated with the platform and that, in operation, contains either the bulk explosive or a constituent of the explosive. The platform comprises a vehicle with a frame, a tank, a load cell structure for connecting the frame and the tank and providing weight data relating to the contents of the tank, and a suspension system that prevents relative movement of the frame and the tank that could compromise the load cell structure. Another embodiment of the platform provides a tank for holding an explosive composition and a rotary shaft that supports a mixing blade that mixes the explosive composition within the tank. The platform further comprises bearing structure for supporting the rotary shaft that is located to deter any of the explosive composition from entering the bearing. A further embodiment of the platform comprises a conduit structure for discharging a bulk explosive into a blast hole that includes a substantially rigid tube with an outlet port for discharging a bulk explosive into the blast hole. The tube is adapted to rotate about a vertical axis such that the outlet port can be moved towards and away from the vehicle along an arc of less than 180°. In one embodiment, the outlet port can be positioned substantially adjacent to an operator's station to allow an operator to readily view the loading of the explosive into the blast hole.

16 Claims, 17 Drawing Sheets

Related U.S. Application Data continuation of application No. 13/153,413, filed on Jun. 4, 2011, now Pat. No. 8,950,330, which is a continuation of application No. 11/162,689, filed on Sep. 19, 2005, now Pat. No. 7,971,534.

(52) U.S. Cl.
CPC ............ *B60P 3/2245* (2013.01); *B60P 3/2265* (2013.01); *F42D 1/10* (2013.01); *Y10T 137/6855* (2015.04); *Y10T 137/8807* (2015.04)

(58) Field of Classification Search
CPC ....... B60P 3/222; B60P 3/2245; B60P 3/2265; Y10T 137/6855; B01F 13/0035; E21C 37/12
See application file for complete search history.

(56) References Cited

U.S. PATENT DOCUMENTS

| | | |
|---|---|---|
| 3,212,318 A | 10/1965 | Lomax |
| 3,216,520 A | 11/1965 | Blonsky |
| 3,303,738 A | 2/1967 | Clay et al. |
| 3,321,035 A | 5/1967 | Tarpley |
| 3,346,213 A | 10/1967 | Nelson |
| 3,361,023 A | 1/1968 | Collins et al. |
| 3,380,333 A | 4/1968 | Clay et al. |
| 3,610,088 A | 10/1971 | Christiansen et al. |
| 3,690,213 A | 9/1972 | Grant |
| 3,769,874 A | 11/1973 | Williams et al. |
| 3,944,090 A | 3/1976 | Flood |
| 3,960,228 A | 6/1976 | Nordstrom |
| 4,058,842 A | 11/1977 | Benton |
| 4,102,240 A | 7/1978 | Cook et al. |
| 4,195,548 A | 4/1980 | Cook et al. |
| 4,199,262 A | 4/1980 | Cribb et al. |
| 4,234,980 A | 11/1980 | DiVito et al. |
| 4,506,990 A | 3/1985 | Neier et al. |
| 4,526,633 A | 7/1985 | Lawrence et al. |
| 4,614,146 A | 9/1986 | Ross et al. |
| 4,685,375 A | 8/1987 | Ross et al. |
| 4,699,060 A | 10/1987 | Vuillaume et al. |
| 4,756,779 A | 7/1988 | Matts |
| 4,774,979 A | 10/1988 | McKeon et al. |
| 5,183,147 A | 2/1993 | Callahan et al. |
| 5,192,819 A | 3/1993 | Baumgartner |
| 5,209,312 A | 5/1993 | Jensen |
| 5,304,744 A | 4/1994 | Jensen |
| 5,429,436 A | 7/1995 | Stone |
| 5,447,090 A | 9/1995 | Adams |
| 5,655,780 A | 8/1997 | Gambrill et al. |
| 5,811,711 A | 9/1998 | Tremblay et al. |
| 5,875,882 A | 3/1999 | Pollock |
| 5,995,888 A | 11/1999 | Hagenbuch |
| 6,013,880 A | 1/2000 | McFarlane et al. |
| 6,168,163 B1 | 1/2001 | Thorson et al. |
| 6,397,719 B1 | 6/2002 | Vestre |
| 6,401,588 B1 | 6/2002 | Atkinson et al. |
| 6,438,792 B1 | 8/2002 | Cappellotto |
| 6,557,448 B2 | 5/2003 | Delagey et al. |
| 7,971,534 B2 | 7/2011 | Waldock |

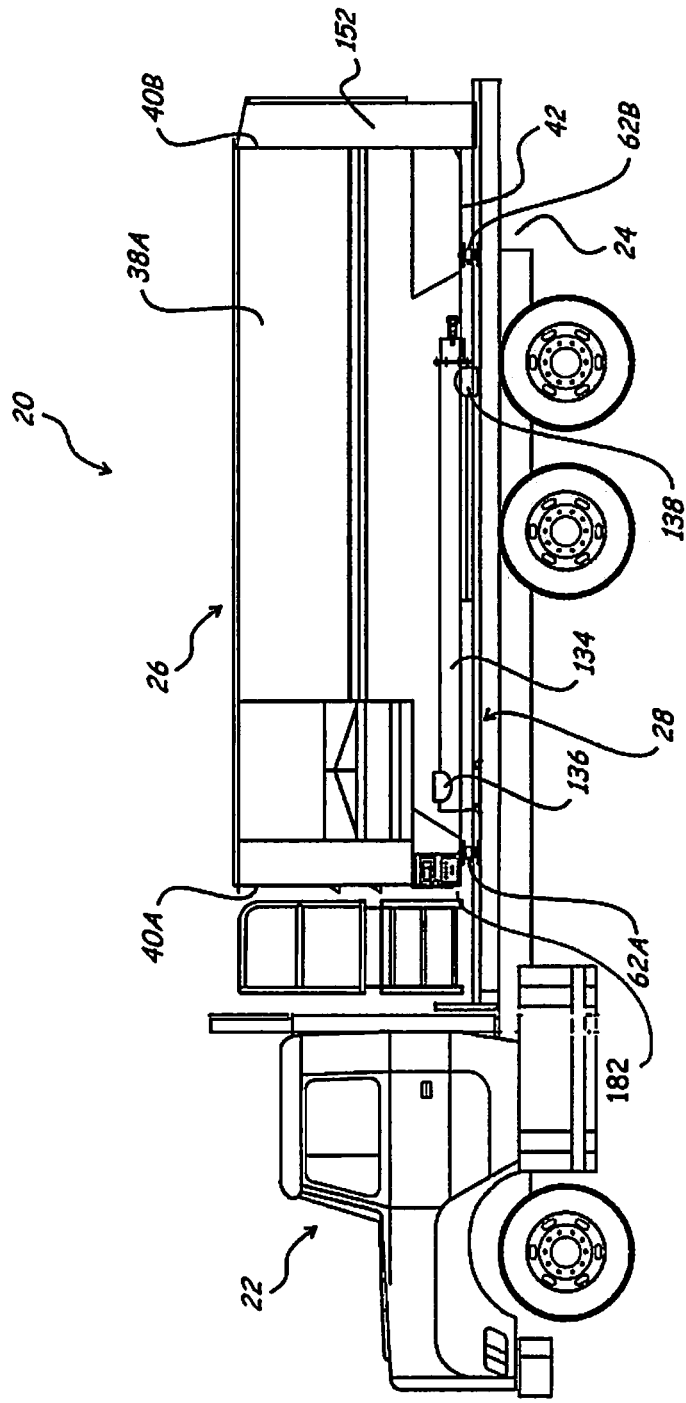

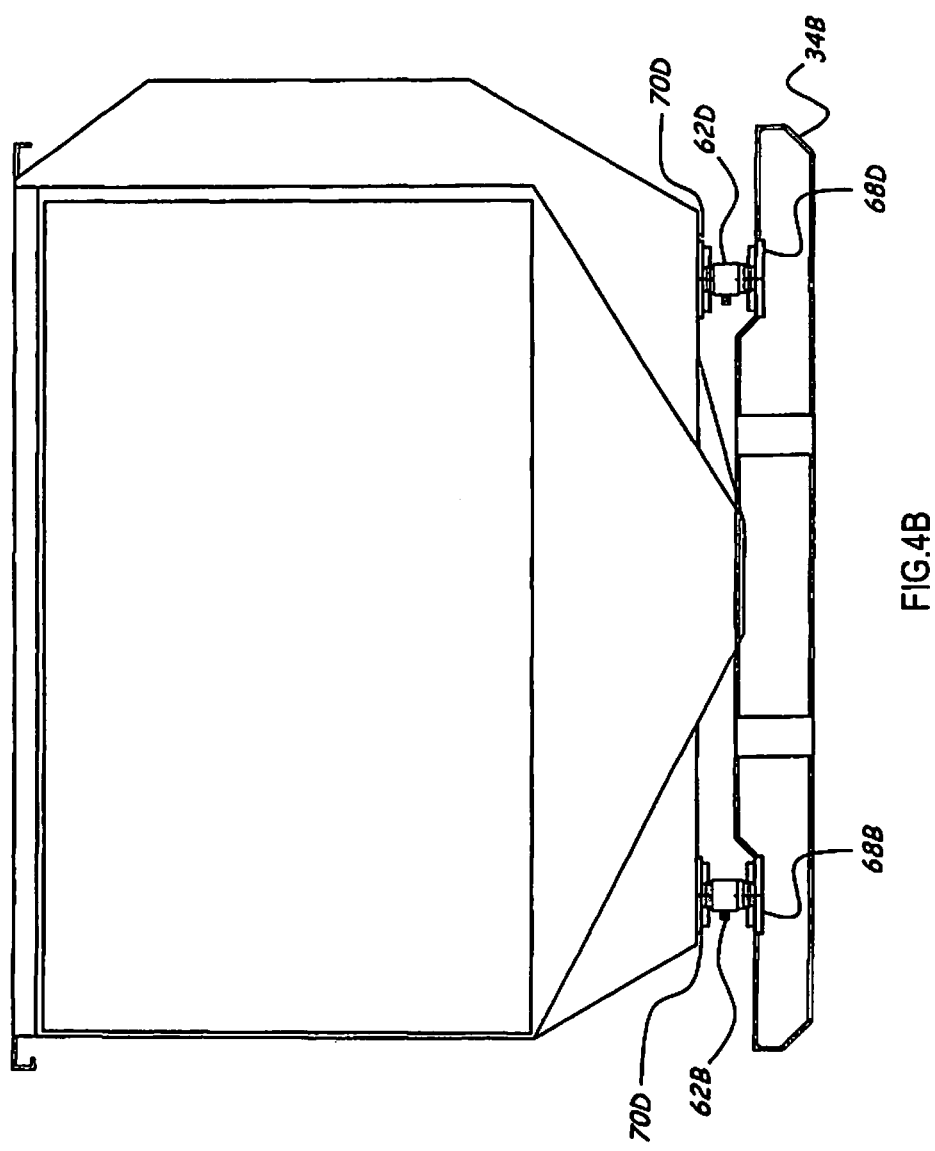

MOBILE PLATFORM FOR THE DELIVERY OF BULK EXPLOSIVE

FIELD OF THE INVENTION

The present invention relates to a mobile platform for the delivery of bulk explosive or bulk blasting agent to a mine site.

BACKGROUND OF THE INVENTION

Generally, there are two approaches utilized in the manufacturing and transporting of bulk explosives or bulk blasting agents that are used in mining operations. Bulk explosives and blasting agents are collectively referred to hereinafter as explosives. The first approach involves manufacturing the bulk explosive at a fixed site by mixing the constituents of the explosive and, if needed, performing other operations on the mixture. One or more vehicles are then used to convey the explosive produced at the fixed site to a blast hole site. One advantage of this approach is that the composition of the explosive can be carefully controlled.

The second approach involves providing a mobile platform that has two or more tanks that each hold one or more of the constituents needed to manufacture the explosive and a mixing apparatus for mixing the constituents of the explosive with one another. Typically, the tanks of the mobile platform are loaded with the constituents of the explosive at a fixed site. After the tanks have been loaded, the mobile platform proceeds to a blast hole site. The mixing of the constituents occurs either at the blast hole site or on the journey to the blast hole site. One advantage of this approach is that the creation of the explosive can be delayed until the mobile platform is at the blast hole site or on the mine property.

Regardless of the approach utilized in the manufacturing and transporting of explosive, there is a need to be able to weigh the explosive and/or the constituents of the explosives during transport. For example, such weighing can be important in assuring that the proper amount of explosive was loaded onto a vehicle that is transporting the explosive from a fixed site that manufactures the explosive. Likewise, the ability to weigh can be important in assuring that the proper amount of each constituent was loaded on to a vehicle that mixes the constituents together. Weighing can also be important in determining if any explosive or constituents of an explosive have been removed from a vehicle between two different times or two different locations. Further, weighing can also be important in determining the cost of explosive that has been loaded into one or more blast holes.

Prior approaches to providing the ability to weigh bulk explosive or the constituents of a bulk explosive during transport have had limited success. This is particularly the case with respect to the transport of bulk explosive or constituents of bulk explosives on mine sites that have rough terrain. Generally, weighing of bulk explosive or the constituents of bulk explosives that are on a mobile platform has been performed with one or more load cells that each extends between a frame and a tank. To perform meaningful weighing measurements, the load cell or cells must bear the full weight of the tank that contains the bulk explosive or a constituent of a bulk explosive. In known prior approaches, the structure used to assure that the load cell or cells bear the full weight of the tank endeavor to keep the portion or portions of a load cell that contact the frame and the portion or portions of the load cell that contact the tank from shifting. This structure is, however, unable to counteract certain forces that commonly act on the tank as the vehicle travels over uneven terrain. As a consequence, the tank shifts and the ability of the load cell to make a measurement is compromised or the cell is damaged. In some cases, the tank can become disengaged from the vehicle.

SUMMARY OF THE INVENTION

The present invention is directed to a mobile platform for the delivery of bulk explosives to a blast hole. The mobile platform is comprised of a vehicle with a frame, a tank for holding a material related to a bulk explosive, and a load cell structure for connecting the frame and the tank to one another and providing weight data relating to any contents of the tank. The mobile plant is further comprised of a suspension that, under conditions in which the load cell structure can make a meaningful measurement, bears substantially none of the weight of the tank and any contents of the tank. However, under conditions in which the tank is subjected to a force that can or is likely to compromise the ability of the load cell structure to make a meaningful measurement, the suspension contributes to counteracting the force in a manner that preserves the ability of the load cell structure to make a meaningful measurement.

In one embodiment, the suspension is comprised of a mount that is operatively attached to the frame; a mount that is operatively attached to the tank and laterally separated from the other mount, a substantially rigid member, a first connector that connects the member to one of the mounts, and a second connector that connects the member to the other mount. In operation, the connectors constrain a point on the member to travel along a path that extends along a portion of a spherical surface relative to a connector. When the tank is subjected to a force that can or is likely to compromise the ability of the load cell structure to make a meaningful measurement, the suspension operates to allow vertical displacement to occur between the tank and frame. However, the suspension also operates such that the member is placed in either a compression or tension state that counteracts the undesirable force.

In another embodiment, the suspension system is comprised of two structures that are each comprised of a mount that is operatively attached to the frame, a mount that is operatively attached to the tank and laterally separated from the other mount, a substantially rigid member, a first connector that connects the rigid element to one of the mounts, and a second connector that connects the rigid member to the other mount. Each structure is positioned so that the substantially rigid member of one structure is not parallel to the substantially rigid member of the other structure. In yet another embodiment, the suspension system is comprised of more than two such structures.

Another embodiment of the suspension is comprised of a first mount that is operatively attached to the frame, a second mount that is operatively attached to the tank and laterally separated from the other mount, a third mount that is operatively attached to one of the frame and the tank and is laterally separated from the first and second mounts, a substantially rigid member, a first connector that connects the member to the first mount, a second connector that connects the member to the second mount, and a third connector that connects the member to the third mount. In one embodiment, the member has a V-shape or a wishbone shape. Yet another embodiment of the suspension is comprised of two such sets of three mounts, substantially rigid member, and three connectors.

A further embodiment of the suspension is comprised of two pairs of mounts, one mount of each pair of mounts is attached to the frame and the other mount of each pair of mounts is attached to the tank, a substantially rigid member, and two pairs of connectors. The mounts are laterally separated from one another. One pair of connectors connects the member to the first pair of mounts, and the second pair of connectors connects the member to the second pair of mounts. In another embodiment, the substantially rigid member is comprised of a first substantially rigid member and a second substantially rigid member that is separated from the first member. The first pair of connectors connects the first member to the first pair of mounts, and the second pair of connectors connects the second member to the second pair of mounts. Yet another embodiment of the suspension is comprised of two such sets of four mounts, substantially rigid member, and four connectors.

Another embodiment of the mobile platform for the delivery of bulk explosives to a blast hole provides the ability to mix a bulk explosive composition held within a tank and deters the migration of the explosive composition into a portion of the mixing apparatus. The platform is comprised of a vehicle with a frame, a tank for holding a bulk explosive composition, a rotary shaft that supports a mixing blade that is used to mix the bulk explosive composition within the tank, and a bearing that supports the rotary shaft. To prevent migration of bulk explosive into the bearing, an end of the rotary shaft passes through a hole in the wall of the tank and extends beyond the exterior surface of the side wall. The bearing is spaced from the exterior surface of the tank and engages the rotary shaft at a distance from the exterior side of the tank. Consequently, a portion of the end of the shaft is left exposed between the tank and the bearing. In operation, any bulk explosive that passes through the hole is likely to be spun off of the exposed portion of the shaft before reaching the housing. In another embodiment, a lip seal is disposed between the portion of the tank that defines the hole and an O-ring is disposed between the lip seal and the rotary shaft to prevent the migration of bulk explosive from the interior of the tank to the exterior of the tank via the hole.

Yet another embodiment of the mobile platform for the delivery of bulk explosive to a blast hole provides a conduit structure for conveying bulk explosive to a blast hole that for the ability to adjust the position of the outlet port of a conduit relative to the vehicle. The mobile platform is comprised of a vehicle with a frame, a tank for holding a material related to a bulk explosive, and a conduit structure that provides for adjusting the position of an outlet port of a tube relative to the vehicle. To elaborate, the conduit structure is comprised of a substantially rigid tube with an inlet port for receiving an explosive composition and an outlet port for discharging an explosive composition into a blast hole. A rotary mount engages the tube and allows the tube to rotate about a vertical axis when the vehicle is located on level ground. Because the tube can rotate about a vertical axis, the outlet port of the tube can be positioned anywhere along an arc that is less than 180°, thereby providing the ability to position the outlet port over a range of distances away from the vehicle. In one embodiment, the outlet port is capable of being positioned substantially adjacent to an operator station associated with the vehicle so that the operator is able to readily view the discharge of the bulk explosive into a blast hole. Further, in yet another embodiment, the operator station is provided with a conduit control panel that is located between where an operator is normally situated within the station and the outlet port when positioned substantially adjacent to the station. Since the operator can operate the conduit structure without losing site of the outlet port or only losing sight of the outlet port for a brief amount of time, more efficient loading of bulk explosive into blast holes is realized.

BRIEF DESCRIPTION OF THE DRAWINGS

FIGS. 1A and 1B are side views of an embodiment of a mobile platform for the delivery of bulk explosive to a blast hole;

FIG. 4B illustrates a back view of portions of the frame, the tank, and portions of a load cell structure that are located between the frame and the tank for the mobile platform shown in FIGS. 1A and 1B;

DETAILED DESCRIPTION

Figure 1B:
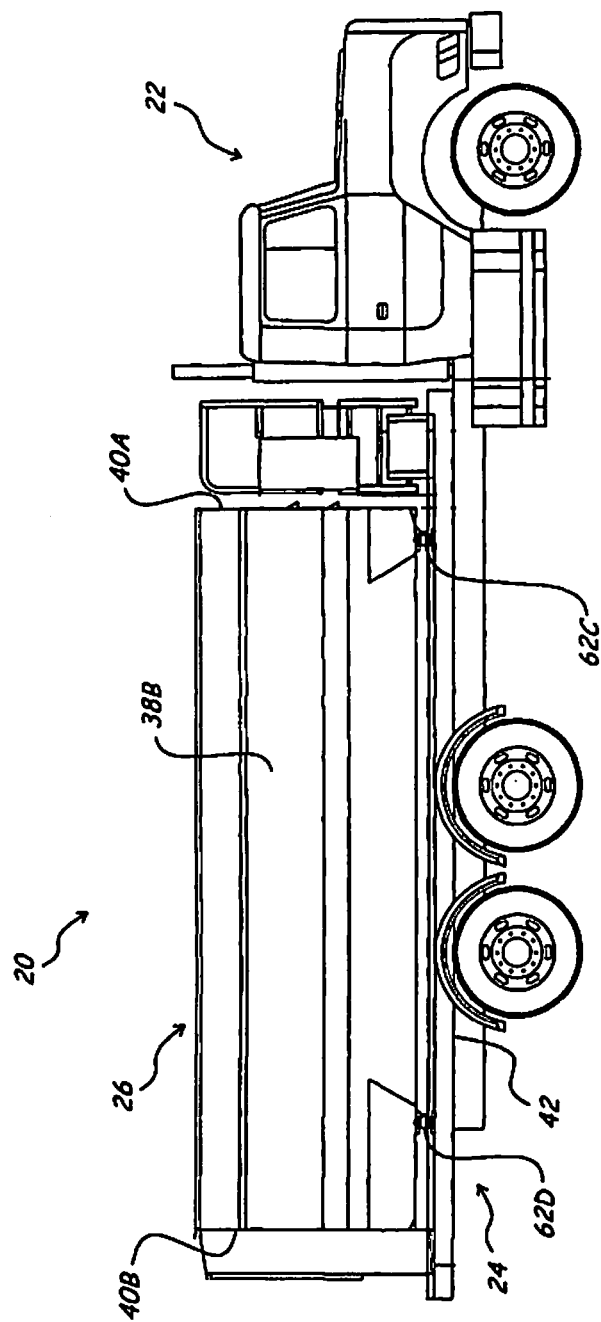

An embodiment of a mobile platform for delivering a bulk explosive to a blast hole or mine site is shown in FIGS. 1A and 1B. The mobile platform 20 is comprised of a vehicle 22 that has a frame 24, a tank 26 for holding a bulk explosive, and a conduit system 28 for conveying a bulk explosive from the tank 26 to a blast hole.

Although the vehicle 20 is a truck that has a motor or engine for use in propelling the vehicle and is capable of being steered by an operator, other vehicles are feasible. For instance, the vehicle can be a skid, trailer, railcar, or any other vehicle that is substantially incapable of being steered by an operator or that does not have a motor or engine. Further, while the vehicle 20 includes wheels with tires to facilitate the movement of the vehicle 20 over terrain, vehicles that employ other ground engaging structures to move the over terrain are also feasible. For example, a tracked vehicle is feasible.

Figure 2:
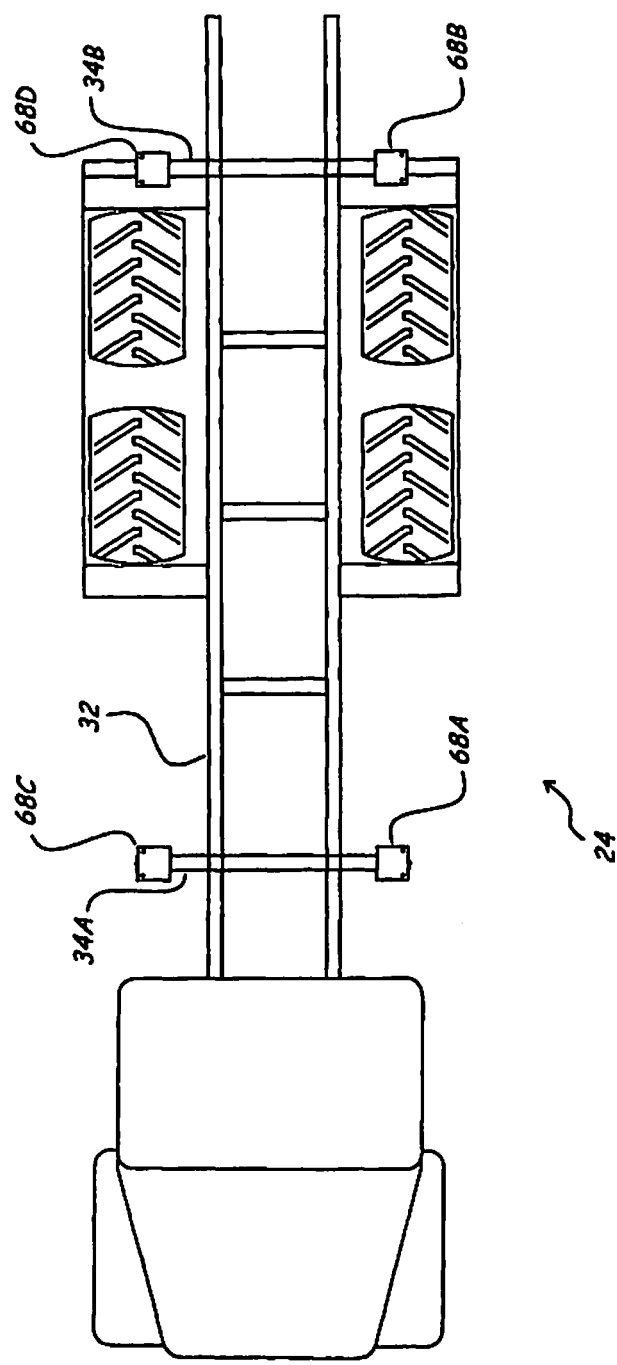
FIG. 2 is a top view of the vehicle associated with the mobile platform shown in FIGS. 1A and 1B.

With reference to FIG. 2, the frame 24 is capable of bearing the weight of the tank 26 and the contents of the tanks when the tank is fully loaded. The frame 24 is comprised of a ladder structure 32 that has two, parallel, longitudinal members and three cross-members. The frame 24 is further comprised of two, tank support members 34A, 34B, that are attached to the ladder structure 32. The ladder structure 32 and tank support members 34A, 34B, are each preferably made of tubular steel. However, other materials capable of bearing the weight of the tank and contents of the tank are feasible. It should also be appreciated that the frame need not be of any particular shape or design.

The tank 26 is generally comprised of two lateral side walls 38A, 38B, two end side walls 40A, 40B, and a bottom wall 42. In addition, with reference to FIG. 3, the tank 26 further comprises a top cover 44 that defines an opening 46 through which a bulk explosive or the constituents of a bulk explosive can be loaded into the tank. A movable hatch cover assembly 48 is provided that allows a hatch 50 to be moved along a pair of rails 52A, 52B, so as to expose the opening 46 so that a bulk explosive or constituents of a bulk explosive can be loaded into the tank or to cover the opening 46. A hydraulic motor 54 is used to rotate a spindle 56 that has carries two sprockets 58A, 58B that each interface with a rack associated with the hatch 50 to drive the hatch 50 between the open and closed positions. It should be appreciated that an opening for the loading of bulk explosive or the constituents of a bulk explosive into the tank can be located elsewhere on the tank 26. Further, other structures known to those skilled in the art can be used to expose and cover/seal an opening wherever the opening may be located on the tank 26.

Figure 4A:
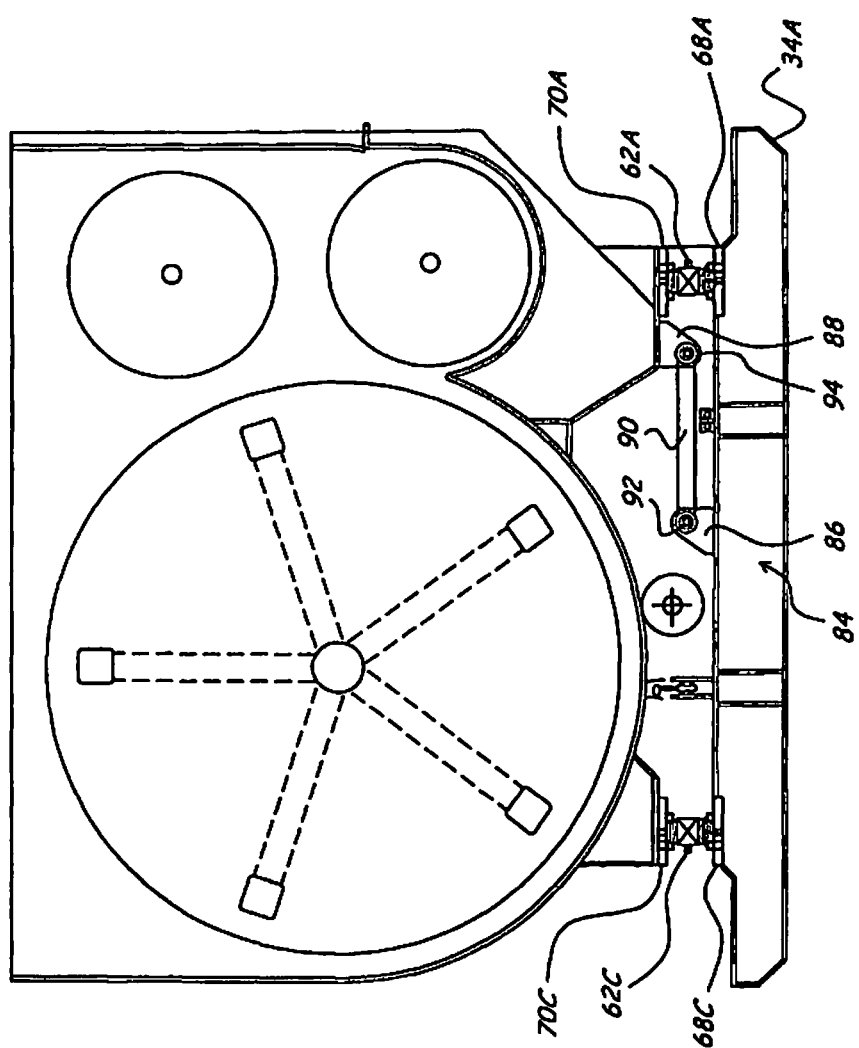
FIG. 4A illustrates a front view of portions of the frame, the tank, and portions of a load cell structure that are located between the frame and the tank for the mobile platform shown in FIGS. 1A and 1B.

With continuing reference to FIGS. 1A, 1B, and 2 and reference to FIGS. 4A and 4B, the mobile platform is further comprised of a load cell structure that provides data relating to the weight of the bulk explosive or a constituent of a bulk explosive that are held in the tank 26 and connects the frame 24 and the tank 26. The load cell structure includes cells 62A, 62B, 62C, and 62D. The load cells are substantially identical to one another. Further, the load cells are each a compression load cell, such as the 153101 Compression Load Cell manufactured by Digi-Star. In operation, the load cells 62A-62D each provide electronic data that relates to any bulk explosive related material contained in the tank 26. This data is processed to provide an operator with weight information on any bulk explosive related material contained in the tank 26. It should be appreciated that a greater or lesser number load cells may be used depending on the particular mobile platform that is utilized for a particular application. Further, a particular mobile platform may be capable of accommodating a different type of load cells. Mobile platforms that use multiple load cells may also be adapted to accommodate load cells of different types.

Figure 5A:
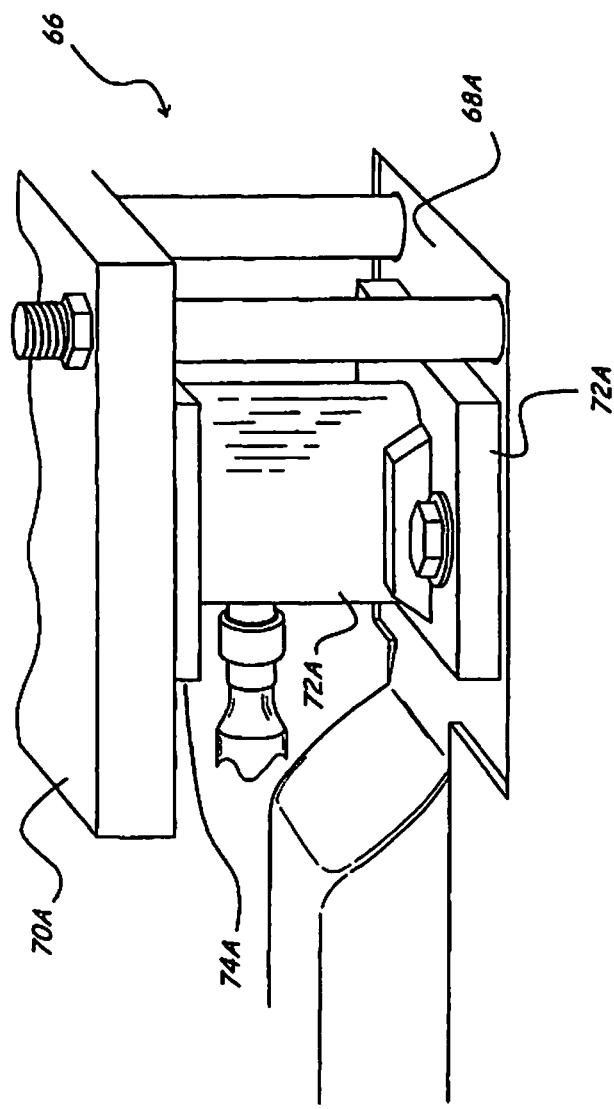
FIG. 5A is a perspective view of the cage structure that is used to hold a load cell in a position to make a weight related measurement concerning any contents of the tank associated with the mobile platform shown in FIGS. 1A and 1B.
Figure 5B:
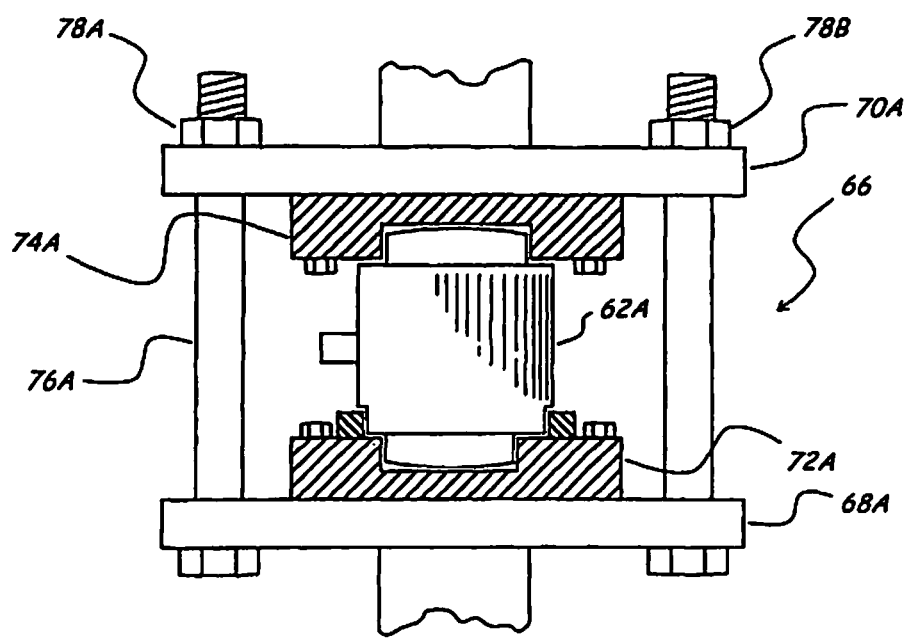
FIG. 5B is a side view of the cage structure shown in FIG. 5A in which the cup structures that hold the ends of a load cell are shown in cross-section.

With reference to FIGS. 5A and 5B, the load cell structure further comprises a cage for each of the load cells 62A-62D that serves to hold a load cell in place for making a measurement and to connect the frame 24 and the tank 26. A cage 66 is described with respect to load cell 62A with the understanding that the same or substantially the same cage structure is used with respect to each of the load cells 62B-62D. The cage 66 is comprised of a bottom load cell pad 68A that is attached to the tank support member 34A. See FIG. 2. A top load cell pad 70A is attached to the tank 26. Attached to the bottom load cell pad 68A is a bottom cup plate 72A that holds the cylindrical bottom portion of the load cell 62A. A top cup plate 74A is attached to the top load cell pad 70A and operates to hold the cylindrical top portion of the load cell 62A. Preferably, the bottom and top cup plates 72A, 74A, are respectively bolted to the bottom and top load cell pads 68A, 70A, to facilitate servicing and replacement of the load cell 62A. A pair of bolts 76A, 76B, and a pair of nuts 78A, 78B, are used to connect the bottom load cell plate 68A to the top load cell plate 70A. The bolts and nuts, however, only loosely connect the bottom load cell plate 68A and the top load cell plate 68B so as not to adversely affect the operation of the load cell 62A. A pair of cleats 80A, 80B, is attached to the bottom cup plate 72A and cooperates with two flat surfaces associated with the load cell 62A to prevent rotation of the load cell. The cage 66 operates to: (a) loosely connect the frame 24 and the tank 26; (b) hold the load cell 62A in a position at which the cell can make a meaningful measurement; and (c) prevent the load cell 62A from rotating such that an electrical connection between the load cell 62A and a processor is lost or damaged.

The load cell structure comprised of the load cells 62A-62D and the cage 66 associated with each of the load cells 62A-62D is capable of maintaining: (a) the position of the load cells 62A-62D such that meaningful measurements relating to the weight of the contents of the tank 26 can be made and (b) the connection between the frame 24 and the tank 26. However, with respect to certain forces that may be applied to the tank 26, particularly when the platform 20 is moving over uneven terrain, these abilities may be compromised such that the position of at least one of the load cells is altered such that the cell is no longer capable of making a measurement and/or the load cell is damaged such that it is no longer capable of making a measurement and/or the tank 26 becomes disengaged from the frame such that at least one of the load cells is no longer capable of making a measurement. To counteract such forces, the platform 20 is further comprised of a suspension system that does not affect the operation of the load cells 62A-62D when such forces are not being applied to the tank 26 but, when any such forces are present, counteracts any such forces so that the ability of the load cell structure to make measurements is preserved.

Figure 6:
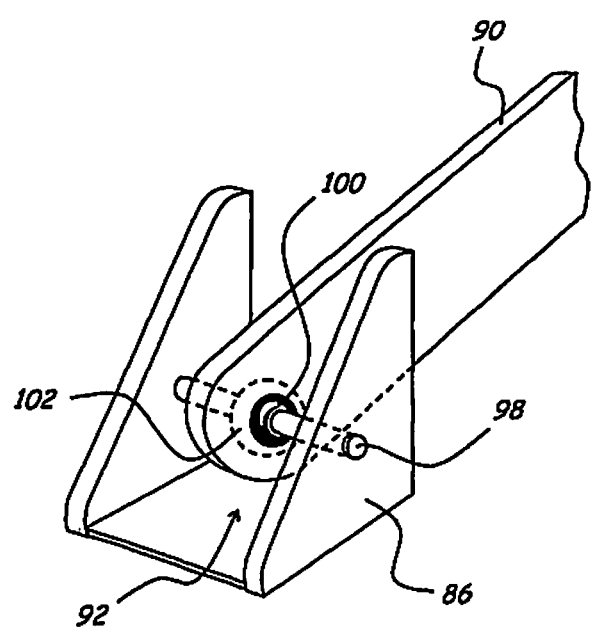
FIG. 6 illustrate the ball joint that is used in the suspension system employed in the mobile platform shown in FIGS. 1A and 1B.

With reference to FIG. 4A, the suspension system is comprised of a first force counteracting structure 84 that is comprised of a first mount 86 that is attached to the frame 24, a second mount 88 that is attached to the tank 26 and laterally displaced from the first mount 86, a substantially rigid member 90, a first connector 92 that connects the member 90 to the first mount 86, and a second connector 94 that connects the member 90 to the second mount 88. The first and second mounts 86, 88, are steel or other suitable material. With reference to FIG. 6, the first connector 92 allows at least some rotational movement of the member 90 about three orthogonal axes. The first connector 92 is comprised of a pivot pin 98, a ball 100 with a hole through which the pivot pin 98 passes, and a cupped ring 102 that surrounds a portion of the ball 100 (the cupped side of the ring substantially conforming to the shape of the ball). The cupped ring 102 is either part of the member 98 or the member 98 is attached to the ring. The first connector 92 is occasionally referred to as a ball joint. More specifically, the first connector 92 is referred to as a rod bearing. The second connector 94 is identical or substantially identical to the first connector 92. It should be appreciated that the connectors used to connect the member 90 to mounts associated with the frame 24 and the tank 26 can be any type of connector that allows for sufficient rotation of the member about three orthogonal axes. For example, a ball-and-socket joint can be employed in place of the rod bearing. Further, it should be appreciated that two different types of joints can be utilized provided each joint provides for sufficient rotation.

Figure 7:
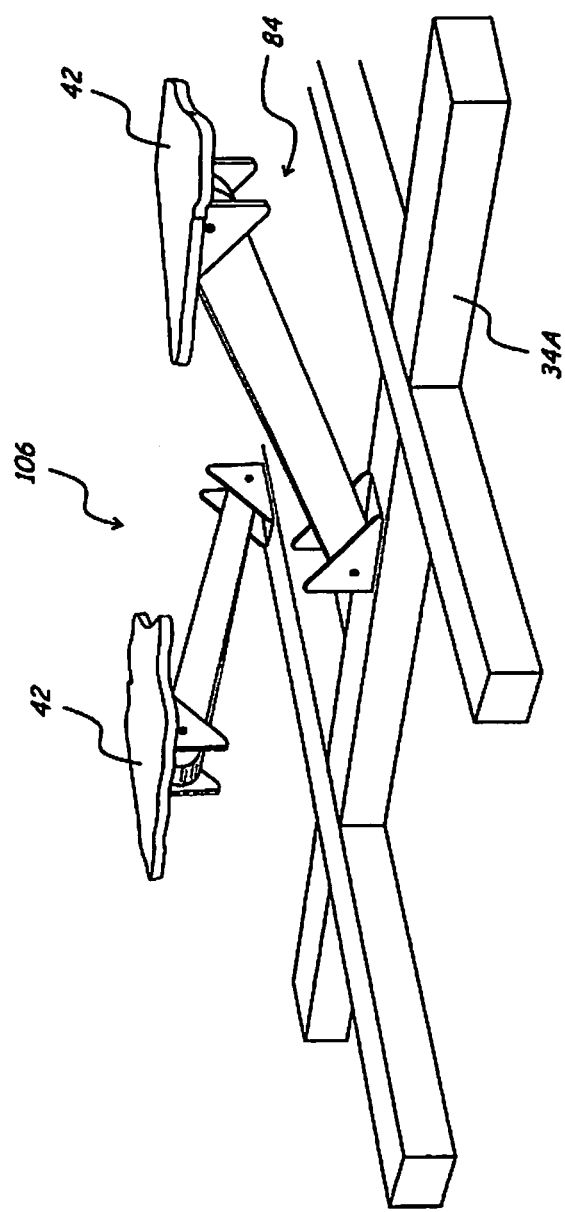
FIG. 7 illustrates two force counteracting structures associated with the suspension system employed in the mobile platform shown in FIGS. 1A and 1B.

With reference to FIG. 7, the suspension system is further comprised of a second force counteracting structure 106 that is substantially identical to the first force counteracting structure 84 but disposed at a right angle to the first force counteracting structure. The joints utilized in the second structure 106 can be the same or different than the joints used in the first structure 84 and the same or different from one another, provided each joint allows sufficient rotation of the member about three orthogonal axes. While the first and second structures 84, 106 are at substantially right angles to one another, this is not believed to be absolutely necessary. However, a heavier duty structure is thought to be needed if the first and second structures 84, 106 are not at substantially right angles to one another.

In operation, the first structure 84 and second structure 106 operate so as not to affect the operation of the load cells 68A-68D when an undesirable force is not present. However, when a lateral force is applied to the tank 26, the first structure 84 operates such that the force is counteracted and the member 90 is placed in either a tensioned or compressed state, depending on the direction of the lateral force. Likewise, when a longitudinal force is applied to the tank 26, the second structure 106 operates such that the force is counteracted and the member is placed in either a tensioned or compressed state, depending on the direction of the longitudinal force. The first structure 84 and the second structure 106 allow the tank 26 to be displaced away from the frame 24. However, the cage 66 associated with one or more of the load cells 62A-62D limits this displacement. It should also be appreciated that first and second structures 84, 106, each operate such that a point on the substantially rigid member associated with the structure is constrained to follow a path that extends over a portion of a spherical surface relative to one or the other of the connectors.

The suspension system 84 is further comprised of third and fourth force counteracting structures that are identical or substantially identical to the first and second structures and oriented at right angles to one another. However, these structures are located closer to the rear wheels of the vehicle and operate in conjunction with the first and second structures 84, 106, to counteract a torque applied to the tank 26 resulting from lateral and/or longitudinal forces.

Figure 8:
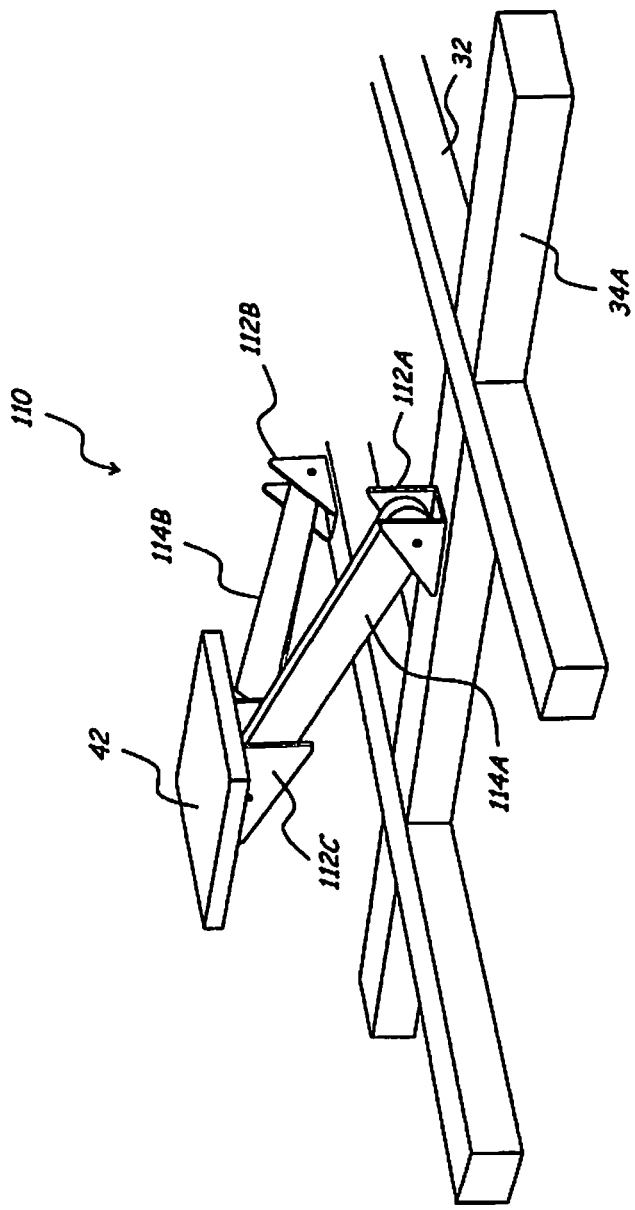
FIG. 8 illustrates a alternative embodiment of a force counteracting structure associated with an alternative suspension system.

With reference to FIG. 8, a first alternative suspension system comprises a first force counteracting structure 110. The structure 100 is comprised of a first mount 112A that is connected to the frame 24, a second mount 112B that is also connected to the frame, a third mount 112C that is connected to the tank 26 but accommodates two connectors, a first substantially rigid member 114A, a second substantially rigid member 114B, a first pair of connectors for connecting the first member 114A to the first mount 112A and the third mount 112C, and a second pair of connectors for connecting the second member 114B to the second mount and the third mount 112C. Each of the connectors functions in the same manner as was noted with respect to the embodiment of the suspension system discussed with respect to FIGS. 4A, 6, and 7. The alternative suspension system comprises a second force counteracting structure that is substantially identical to the structure 110. However, the second structure is located closer to the rear wheels of the vehicle 22. In operation, the first force counteracting structure 110 and second force counteracting structure operate to counteract lateral and longitudinal forces and torque resulting from such lateral and/or longitudinal forces. It should be appreciated that if the lines defined by each pair of connectors in the structure 110 intersect, the two substantially rigid members 114A, 114B can be replaced with a single member, such as a plate. Moreover, it is also possible to invert the structure 110 such that the first and second mounts are attached to the tank 26 and the third mount is attached to the frame 24.

Figure 9:
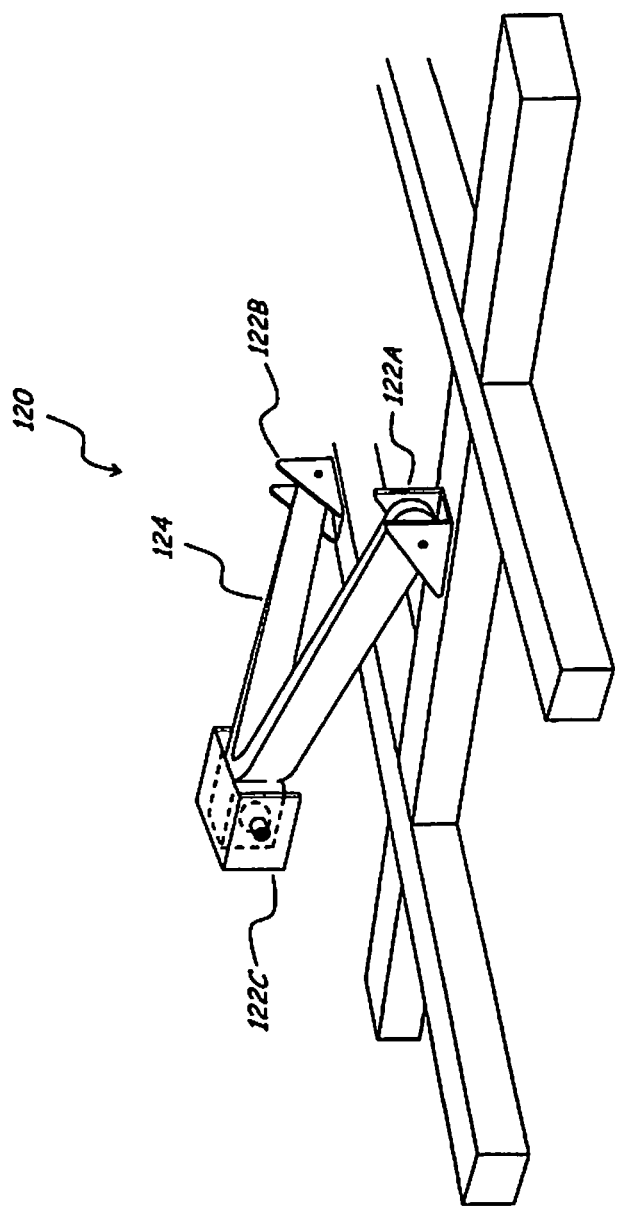
FIG. 9 illustrates a second alternative embodiment of a force counteracting structure associated with a second alternative suspension system.

With reference to FIG. 9, a second alternative suspension comprises a first force counteracting structure 120. The structure 120 is comprised of a first mount 122A that is connected to the frame 24, a second mount 122B that is also connected to the frame, a third mount 122C that is connected to the tank 26 but accommodates one connector, a substantially rigid member 124 that has a V-shape or wishbone shape, a first connector for connecting the member 124 to the first mount 122A, a second connector for connecting the member 124 to the second mount, and a third connector for connecting the member to the third mount 122C. The second alternative suspension system comprises a second force counteracting structure that is substantially identical to the structure 120. However, the second structure is located closer to the rear wheels of the vehicle 22. In operation, the first force counteracting structure 120 and second force counteracting structure operate to counteract lateral and longitudinal forces and torque resulting from such lateral and/or longitudinal forces. It is also possible to invert the structure 120 such that the first and second mounts are attached to the tank 26 and the third mount is attached to the frame 24. It is also possible to replace the wishbone or V-shaped rigid member with a plate.

It should be appreciated that the load cell structure and suspension system can be adapted to each tank in mobile platforms that have two or more tanks that each contain or are capable of containing a constituent of a bulk explosive. Further, the load cell structure and suspension structure can be adapted to the particular design of the mobile platform. In this regard, a greater or lesser number of load cells may be needed and fewer or more suspension structures can be utilized as needed.

Figure 10:
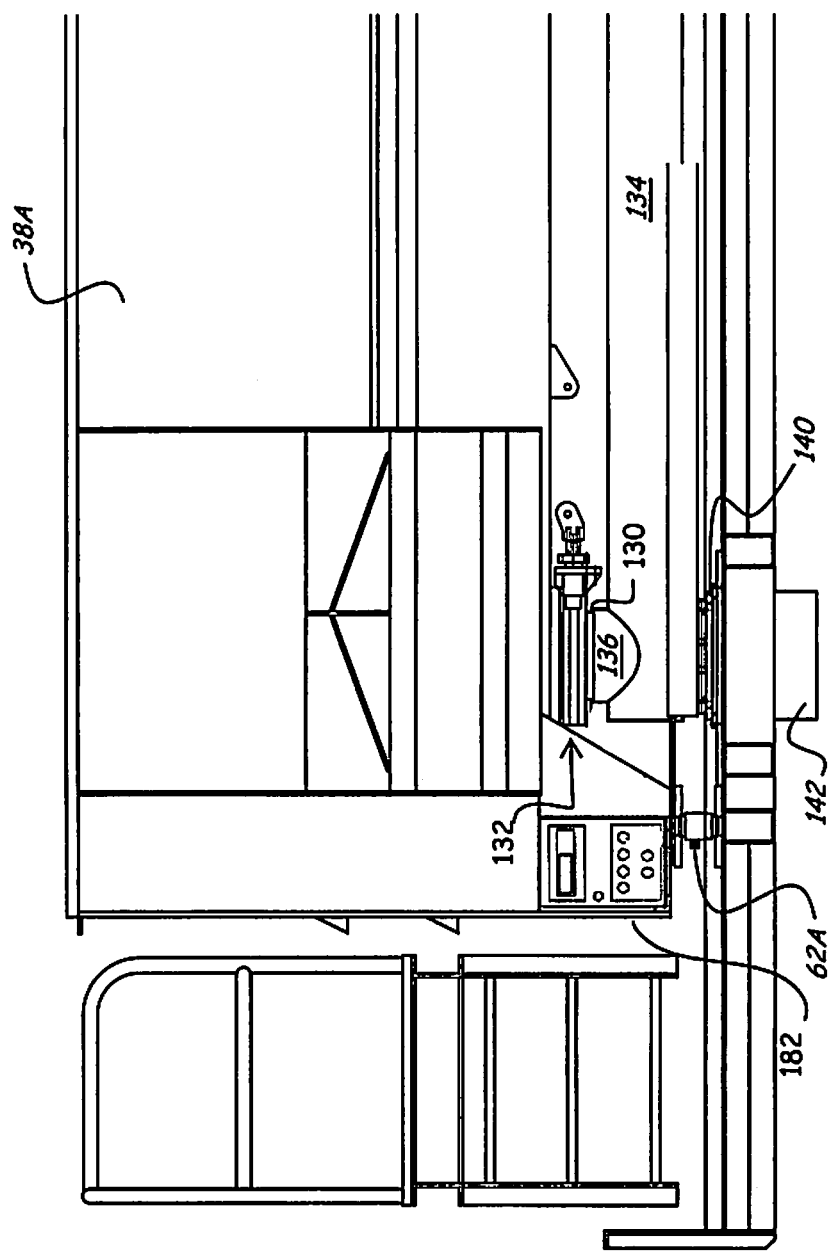
FIG. 10 illustrates certain elements of the conduit system associated with the vehicle shown in FIGS. 1A and 1B.
Figure 11:
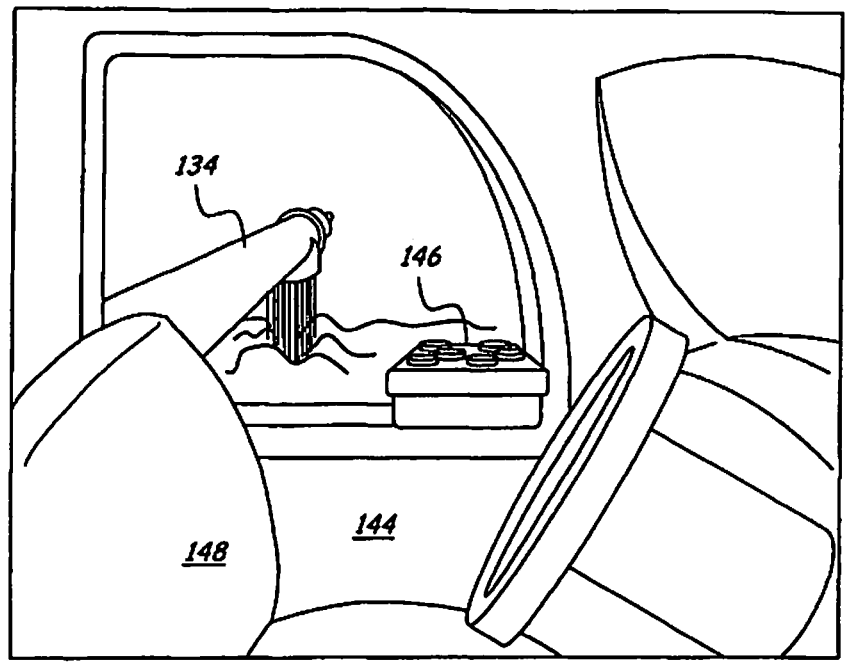
FIG. 11 illustrates a portion of an operator's station associated with the vehicle shown in FIGS. 1A and 1B.

With reference to FIGS. 1A and 10, the conduit system 28 is comprised of a discharge port 130 through which bulk explosive is discharged from the tank 26; a hydraulic gate 132 that, when open allows bulk explosive to flow from the tank 26 through the discharge port 130; a substantially rigid tube 134 with an inlet port 136 for receiving bulk explosive from the discharge port 130 and an outlet port 138 for transferring bulk explosive from the tube 134 to a blast hole. Housed within the rigid tube 134 is a hydraulic auger that facilitates movement of the bulk explosive from the inlet port 136 to the outlet port 138. The tube 134 is attached to a pedestal 140 that permits the tube 134 to be rotated through an arc that is constrained to be less than 180°. A hydraulic actuator 142 is operatively attached to the tube 134 and capable of rotating the tube 134 through the noted arc. With reference to FIG. 11, the platform 20 comprises an operator's station 144 that includes a conduit system control panel 146. The conduit system control panel 146 allows an operator to slew the tube 134 towards and away from the stowed position shown in FIG. 1A and to a location along the noted arc at which the outlet port is positioned over a blast hole. The control panel 146 also allows the operator to start the loading of a blast hole by first starting the auger within the tube 134 and then opening the hydraulic gate 132 to allow bulk explosive to pass from the tank 26 through the discharge port 130 and into the inlet port 136 of the tube 134. The auger operates to move the bulk explosive from the inlet port 136 towards the outlet port 138. As shown in FIG. 11, at least a portion of the arc along which the outlet port 138 can be positioned is substantially adjacent to the operator's station 144 and the control panel 146 is positioned between the location at which the operator is normally located with the station, i.e., a seat 148. This positioning of the control panel 146 facilitates the loading of bulk explosive into a blast hole by allowing an operator to view the loading of bulk explosive into a blast hole and control the operation of the conduit system 28 without having to look away from the loading of the explosive into the blast hole or only look away for a short amount of time.

The conduit system 28 also facilitates the operation of the load cells 62A-62D. To elaborate, the discharge port 130 is not connected to the inlet port 136 of the tube 134. Consequently, tank 26 is insulated or isolated from forces being transmitted from the tube 134 and related structures that could affect the measurements of the load cells 62A-62D. The need for a connection is avoided by aligning the discharge port 130 and the inlet port 136 but designing the discharge port 130 to fit within the footprint of the inlet port 136. This is achieved by in the illustrated case by designing the discharge port 130 with a smaller diameter than the diameter of the inlet port 136.

Figure 3:
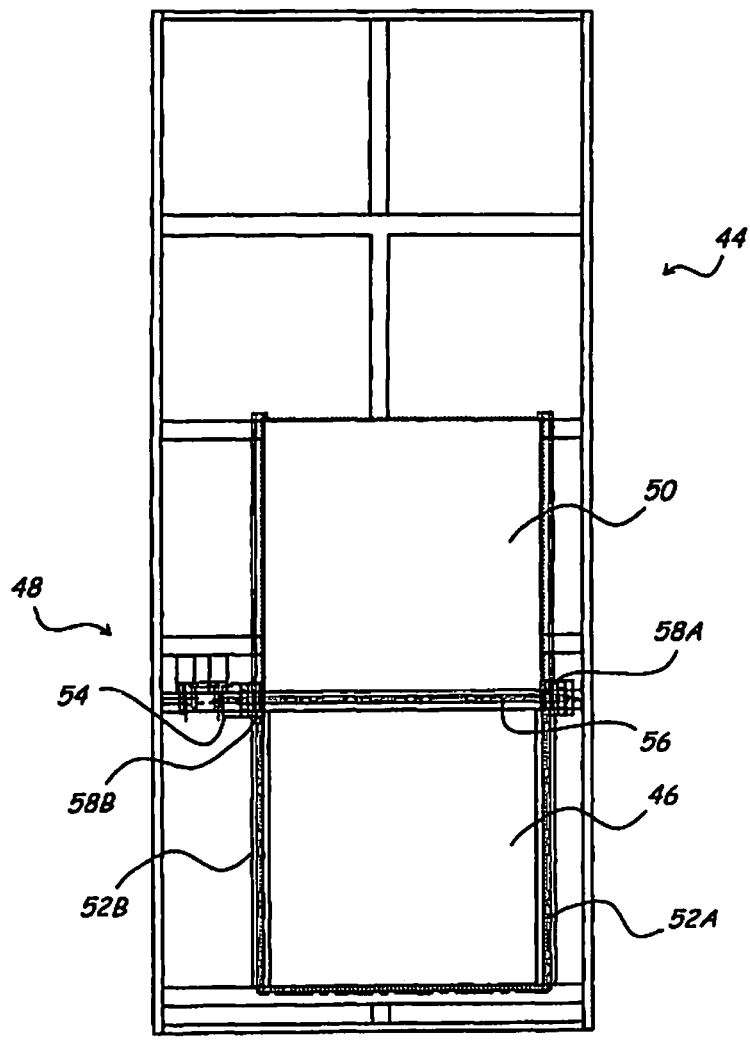
FIG. 3 is a top view of the tank that illustrates the opening through which a bulk explosive or constituents of a bulk explosive are loaded into the tank and a motorized hatch cover for the mobile platform shown in FIGS. 1A and 1B.
Figure 12:
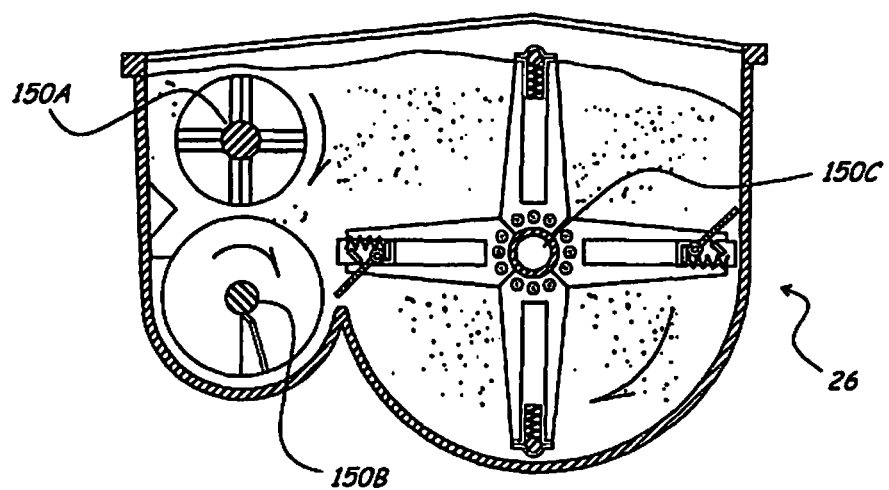
FIG. 12 is a cross-sectional view of the tank associated with the vehicle shown in FIGS. 1A and 1B that shows the three rotary elements that are substantially located within the tank and used to mix the constituents of a bulk explosive within the tank.
Figure 13:
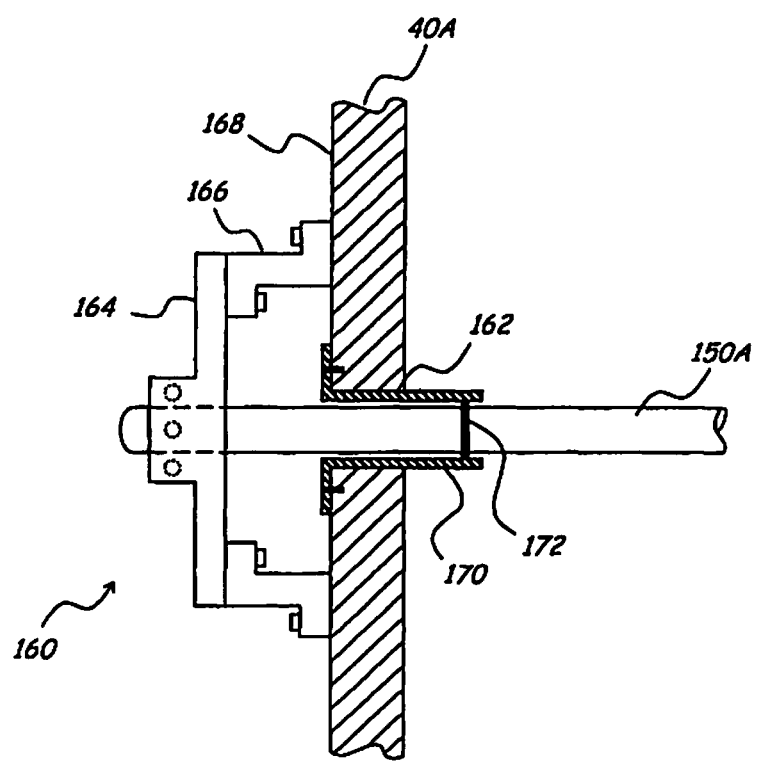
FIG. 13 is a side view and partial cross-sectional view of a stand-off bearing for supporting a rotary shaft that is associated with one of the three rotary elements illustrated in FIG. 12 and a sealing structure that is used in conjunction with the bearing.

The platform 20 further comprises a mixing device that is used to mix constituents of a bulk explosive that are loaded into the tank 26. The mixing device is substantially the mixing device that is disclosed in U.S. Pat. No. 4,506,990, which is incorporated by reference herein in its entirety. With reference to FIG. 12, the mixing device comprises three rotary shafts 150A, 150B, and 150C that each supports a blade structure that is used to mix the bulk explosive contained in the tank 26. The gearing that is used to drive rotary shafts 150A, 150B, and 150C is located within a housing 152 that is located behind the end wall 40B of the tank 26. The gearing is illustrated in FIG. 3 of the '990 patent and the operation of the gearing is discussed in the '990 patent. Consequently, various aspects of the gearing and their operation will not be discussed any further herein. However, even though the platform 20 substantially incorporates the mixing device of the '990 patent, modifications have been made so that the mixing device can be utilized in the manufacture and/or delivery of bulk explosive. To elaborate, the each end of rotary shafts 150A, 150B, and 150C are supported by a stand-off bearing structure. With reference to FIG. 13, a stand-off bearing structure 160 is described with respect to the an end of the rotary shaft 150A that passes through a hole 162 in the end side wall 40A with the understanding that the stand-off bearing structure utilized with the other end of the rotary shaft 150A and with each end of the rotary shafts 150B and 150C are substantially similar. The stand-off bearing structure 160 comprises a bearing housing 164 that holds bearings that engage the end of the shaft 150A. A stand-off structure 166 is operatively attached to an exterior surface 168 of the end side wall 40A and the housing 164. The structure 166 supports the housing 164 and holds the housing 164 at a distance from the exterior surface 168 such that a portion of the shaft 150A is exposed. As a consequence, if any bulk explosive passes through the hole 162, the bulk explosive is likely to fall off of the shaft or be spun off of the shaft 150A before reaching the bearing. To further reduce the possibility of any bulk explosive reaching the bearings, a lip seal 170 is established between the hole 162 and the rotary shaft 150A and an O-ring 172 is established between the lip seal 170 and the rotary shaft 150A. The lip seal 170 and O-ring are made of Viton or other material that is chemically resistant.

Figure 14:
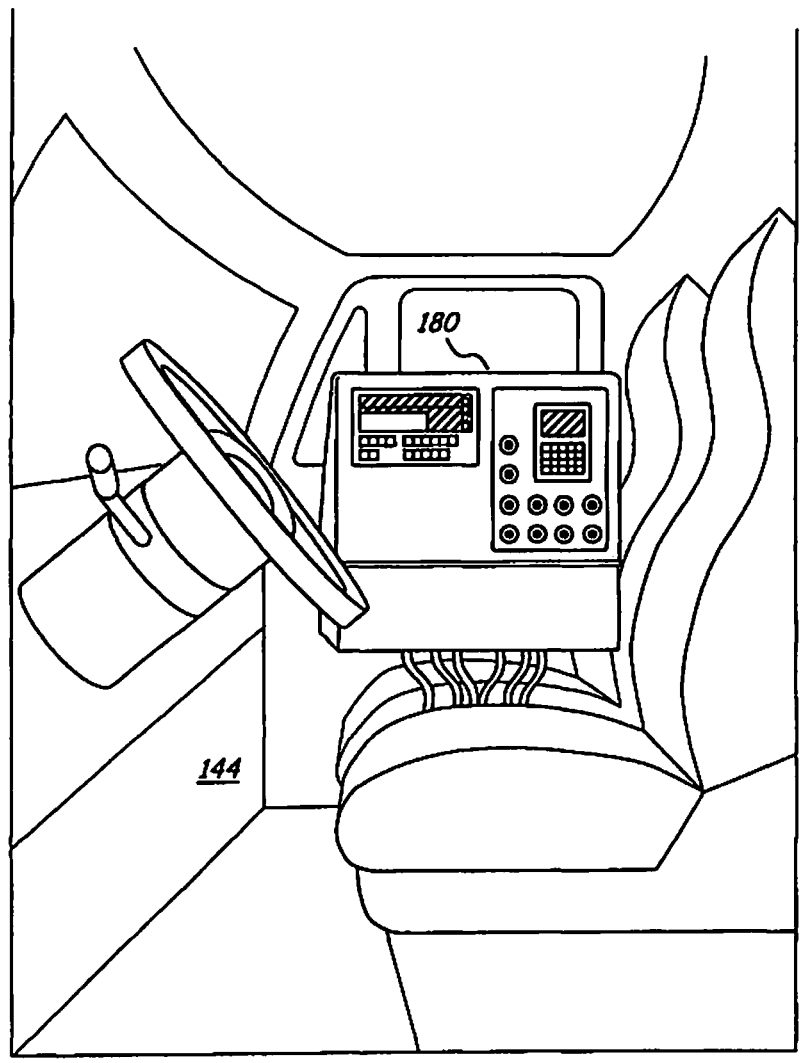
FIG. 14 illustrates a processor that is located in the operator's station and that receives data from each of the load cells, processes the data, and provides the operator with information related to the weight of any contents of the tank.

With reference to FIGS. 1A and 14, a first processor 180 for receiving data from the load cells 62A-62D, processing the data, and providing an operator with information related to the weight of any contents of the tank 26 is located in the operator's station 144. Located outside of the operator's station and accessible to an individual located outside of or off of the platform 20 is a second processor 182 that provides many of the same functions as are provided by the first processor 180. By having two processors and locating one processor inside of the operator's station 144 and locating the other processor such that it is accessible to an individual located outside of or off of the platform 20, a single operator can load the tank using the second processor 182 and unload the tank by discharging bulk explosive into blast holes using the first processor 180.

The platform 20 is capable of manufacturing and delivering bulk explosives, such as ANFO, heavy ANFO, emulsion blends, slurries, and hybrid explosives that include bulking and/or sensitizing agents.

The embodiments of the invention described hereinabove are intended to describe the best mode known of practicing the invention and to enable others skilled in the art to utilize the invention.

What is claimed is:

1. A mobile platform for the delivery of bulk explosive comprising:
    a vehicle comprising a frame;
    a tank for holding a material related to a bulk explosive;
    a conduit for conveying a material related to a bulk explosive from the tank and towards a blast hole;
    a load cell structure for connecting the frame and the tank and providing weight/mass data relating to any contents of the tank; and
    a suspension for connecting the frame to the tank and facilitating operation of the load cell structure, the suspension structure comprising:
        a first substantially rigid element that extends between and includes first ends, a first longitudinal axis extending between the first ends;
        a first frame ball-and-socket-like structure for connecting one of the first ends of the first substantially rigid element to the frame;
        a first tank ball-and-socket-like structure for connecting the other of the first ends of the first substantially rigid element to the tank;
        a second substantially rigid element that extends between and includes second ends, a second longitudinal axis extending between the second ends;
        a second frame ball-and-socket-like structure for connecting one of the second ends of the second substantially rigid element to the frame; and
        a second tank ball-and-socket-like structure for connecting the other of the second ends of the second substantially rigid element to the tank;
        wherein the first substantially rigid element is separate from the second substantially rigid element;

wherein the first frame ball-and-socket-like structure, first tank ball-and-socket-like structure, second frame ball-and-socket-like structure, and second tank ball-and-socket-like structure each being separate from one another.

2. A mobile platform for the delivery of bulk explosive, as claimed in claim 1, wherein:
in a plan view, the first and second longitudinal axes intersect.

3. A mobile platform for the delivery of bulk explosive, as claimed in claim 2, wherein:
in a plan view, the first and second longitudinal axes substantially are at right angles to one another.

4. A mobile platform for the delivery of bulk explosive, as claimed in claim 1, wherein:
the first frame ball-and-socket-like structure and the first tank ball-and-socket-like structure allow rotational movement of the first substantially rigid element but prevent translational movement of the first substantially rigid element.

5. A mobile platform for the delivery of bulk explosive, as claimed in claim 4, wherein:
the second frame ball-and-socket-like structure and the second tank ball-and-socket-like structure allow rotational movement of the second substantially rigid element but prevent translational movement of the second substantially rigid element.

6. A mobile platform for the delivery of bulk explosive, as claimed in 1, wherein:
at least one of the first and second frame ball-and-socket-like structures and the first and second tank ball-and-socket-like structure includes a rod bearing having a ball that defines a hole and a pivot pin located within the hole.

7. A mobile platform for the delivery of bulk explosive, as claimed in claim 1, wherein:
two or more of the first and second frame ball-and-socket-like structures and the first and second tank ball-and-socket-like structure each include a rod bearing having a ball that defines a hole and a pivot pin located within the hole.

8. A mobile platform for the delivery of bulk explosive, as claimed in claim 1, further comprising:
a third substantially rigid element that extends between and includes third ends, a third longitudinal axis extending between the third ends;
a third frame ball-and-socket-like structure for connecting one of the third ends of the third substantially rigid element to the frame;
a third tank ball-and-socket-like structure for connecting the other one of the third ends of third substantially rigid element to the tank;
a fourth substantially rigid element that extends between and include fourth ends, a fourth longitudinal axis extending between the fourth ends;
a fourth frame ball-and-socket-like structure for connecting one of the fourth ends of the fourth substantially rigid element to the frame; and
a fourth tank ball-and-socket-like structure for connecting the other of the fourth ends of the fourth substantially rigid element to the tank;
wherein the first, second, third, and fourth substantially rigid elements are each separate from one another;
wherein the first frame ball-and-socket-like structure, first tank ball-and-socket-like structure, second frame ball-and-socket-like structure, second tank ball-and-socket-like structure, third frame ball-and-socket-like structure, third tank ball-and-socket-like structure, fourth frame ball-and-socket-like structure, and fourth tank ball-and-socket-like structure each being separate from one another.

9. A mobile platform for the delivery of bulk explosive, as claimed in claim 8, wherein:
in a plan view, the third and fourth longitudinal axes intersect and substantially are at right angles to one another.

10. A mobile platform for the delivery of bulk explosive, as claimed in claim 8, wherein:
the third frame ball-and-socket-like structure and the third tank ball-and-socket-like structure allow rotational movement of the third substantially rigid element but prevent translational movement of the third substantially rigid element; and
the fourth frame ball-and-socket-like structure and the fourth tank ball-and-socket-like structure allow rotational movement of the fourth substantially rigid element but prevent translational movement of the fourth substantially rigid element.

11. A mobile platform for the delivery of bulk explosive, as claimed in 8, wherein:
each of the third and fourth frame ball-and-socket-like structures and the third and fourth tank ball-and-socket-like structure includes a rod bearing having a ball that defines a hole and a pivot pin located within the hole.

12. A mobile platform for the delivery of bulk explosive comprising:
a vehicle comprising a frame;
a tank for holding a material related to a bulk explosive;
a conduit for conveying a material related to a bulk explosive from the tank and towards a blast hole;
a load cell structure for connecting the frame and the tank and providing weight/mass data relating to any contents of the tank; and
a suspension for connecting the frame to the tank and facilitating operation of the load cell structure, the suspension structure comprising:
a first substantially rigid element that extends between and includes first ends, a first longitudinal axis extending between the first ends;
a first frame ball-and-socket-like structure for connecting one of the first ends of the first substantially rigid element to the frame;
a first tank ball-and-socket-like structure for connecting the other of the first ends of the first substantially rigid element to the tank;
a second substantially rigid element that extends between and includes second ends, a second longitudinal axis extending between the second ends;
a second frame ball-and-socket-like structure for connecting one of the second ends of the second substantially rigid element to the frame;
a second tank ball-and-socket-like structure for connecting the other of the second ends of the second substantially rigid element to the tank;
a third substantially rigid element that extends between and includes third ends, a third longitudinal axis extending between the third ends;
a third frame ball-and-socket-like structure for connecting one of the third ends of the third substantially rigid element to the frame;
a third tank ball-and-socket-like structure for connecting the other one of the third ends of the third substantially rigid element to the tank;

a fourth substantially rigid element that extends between and includes fourth ends, a fourth longitudinal axis extending between the fourth ends;

a fourth frame ball-and-socket-like structure for connecting one of the fourth ends of the fourth substantially rigid element to the frame;

a fourth tank ball-and-socket-like structure for connecting the other of fourth ends of the fourth substantially rigid element to the tank;

wherein the first, second, third, and fourth substantially rigid elements are each separate from one another;

wherein the first frame ball-and-socket-like structure, first tank ball-and-socket-like structure, second frame ball-and-socket-like structure, second tank ball-and-socket-like structure, third frame ball-and-socket-like structure, third tank ball-and-socket-like structure, fourth frame ball-and-socket-like structure, and fourth tank ball-and-socket-like structure each being separate from one another.

13. A mobile platform for the delivery of bulk explosive, as claimed in 12, wherein:

in a plan view, the first and second longitudinal axes intersect; and in a plan view, the third and fourth longitudinal axes intersect.

14. A mobile platform for the delivery of bulk explosive, as claimed in 12, wherein:

the first frame ball-and-socket-like structure and the first tank ball-and-socket-like structure allow rotational movement of the first substantially rigid element but prevent translational movement of the first substantially rigid element;

the second frame ball-and-socket-like structure and the second tank ball-and-socket-like structure allow rotational movement of the second substantially rigid element but prevent translational movement of the second substantially rigid element;

the third frame ball-and-socket-like structure and the third tank ball-and-socket-like structure allow rotational movement of the third substantially rigid element but prevent translational movement of the third substantially rigid element; and the fourth frame ball-and-socket-like structure and the fourth tank ball-and-socket-like structure allow rotational movement of the fourth substantially rigid element but prevent translational movement of the fourth substantially rigid element.

15. A mobile platform for the delivery of bulk explosive, as claimed in 12, wherein:

each of the first, second, third, and fourth frame ball-and-socket-like structures and the first, second, third, and fourth tank ball-and-socket-like structure includes a rod bearing having a ball that defines a hole and a pivot pin located within the hole.

16. A mobile platform for the delivery of bulk explosive comprising:

a vehicle comprising a frame;

a tank for holding a material related to a bulk explosive;

a conduit for conveying a material related to a bulk explosive from the tank and towards a blast hole;

a load cell structure for connecting the frame and the tank and providing weight/mass data relating to any contents of the tank; and a suspension for connecting the frame to the tank and facilitating operation of the load cell structure, the suspension structure comprising:

a first substantially rigid element that extends between and includes first ends;

a first frame ball-and-socket-like structure for connecting one of the first ends of the first substantially rigid element to the frame;

a first tank ball-and-socket-like structure for connecting the other of the first ends of the first substantially rigid element to the tank;

a second substantially rigid element that extends between and includes second ends;

a second frame ball-and-socket-like structure for connecting one of the second ends of the second substantially rigid element to the frame;

a second tank ball-and-socket-like structure for connecting the other of the second ends of the second substantially rigid element to the tank;

a third substantially rigid element that extends between and includes third ends;

a third frame ball-and-socket-like structure for connecting one of the third ends of the third substantially rigid element to the frame;

a third tank ball-and-socket-like structure for connecting the other one of the third ends of the third substantially rigid element to the tank;

a fourth substantially rigid element that extends between and includes fourth ends;

a fourth frame ball-and-socket-like structure for connecting one of the fourth ends of the fourth substantially rigid element to the frame;

a fourth tank ball-and-socket-like structure for connecting the other of fourth ends of the fourth substantially rigid element to the tank;

the first substantially rigid element has a first longitudinal axis extending between the first ends;

the second substantially rigid element has a second longitudinal axis extending between the second ends;

wherein, in a plan view, the first and second longitudinal axes intersect and are at right angles to one another;

the third substantially rigid element has a third longitudinal axis extending between the third ends;

the fourth substantially rigid element has a fourth longitudinal axis extending between the fourth ends;

wherein, in a plan view, the third and fourth longitudinal axes intersect and are at right angles to one another;

wherein the first, second, third, and fourth substantially rigid elements are each separate from one another;

wherein the first frame ball-and-socket-like structure, first tank ball-and-socket-like structure, second frame ball-and-socket-like structure, second tank ball-and-socket-like structure, third frame ball-and-socket-like structure, third tank ball-and-socket-like structure, fourth frame ball-and-socket-like structure, and fourth tank ball-and-socket-like structure each being separate from one another;

the first frame ball-and-socket-like structure and the first tank ball-and-socket-like structure allow rotational movement of the first substantially rigid element but prevent translational movement of the first substantially rigid element;

the second frame ball-and-socket-like structure and the second tank ball-and-socket-like structure allow rotational movement of the second substantially rigid element but prevent translational movement of the second substantially rigid element;

the third frame ball-and-socket-like structure and the third tank ball-and-socket-like structure allow rotational movement of the third substantially rigid element but prevent translational movement of the third substantially rigid element;

the fourth frame ball-and-socket-like structure and the fourth tank ball-and-socket-like structure allow rotational movement of the fourth substantially rigid element but prevent translational movement of the fourth substantially rigid element; and each of the first, second, third, and fourth frame ball-and-socket-like structures and the first, second, third, and fourth tank ball-and-socket-like structure includes a rod bearing having a ball that defines a hole and a pivot pin located within the hole.

* * * * *